(12) United States Patent
Hama et al.

(10) Patent No.: US 6,690,496 B2
(45) Date of Patent: Feb. 10, 2004

(54) MULTI-BEAM SCANNING DEVICE

(75) Inventors: Yoshihiro Hama, Saitama-ken (JP); Masakazu Hirano, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/347,917

(22) Filed: Jan. 22, 2003

(65) Prior Publication Data

US 2003/0142381 A1 Jul. 31, 2003

(30) Foreign Application Priority Data

Jan. 25, 2002 (JP) .......................... 2002-016756
Mar. 26, 2002 (JP) .......................... 2002-085875

(51) Int. Cl.[7] .............................................. G02B 26/08
(52) U.S. Cl. .................. 359/204; 359/216; 359/638; 359/833; 359/837; 362/339; 362/227
(58) Field of Search ......................... 359/204, 216–219, 359/831, 833–834, 837, 618, 629, 634, 638, 639; 347/233, 243, 238; 362/11, 227, 244, 245, 248, 249, 339, 340; 358/475

(56) References Cited

U.S. PATENT DOCUMENTS 6,178,029 B1 * 1/2001 Kamikubo .................. 359/204
6,181,363 B1 * 1/2001 Satoh .......................... 347/238
6,198,562 B1   3/2001 Hayashi et al.

FOREIGN PATENT DOCUMENTS

| JP | 2-35410 | 2/1990 |
| JP | 8-304722 | 11/1996 |
| JP | 9-146024 | 6/1997 |
| JP | 20 00-249948 | 9/2000 |
| JP | 200 1-4941 | 1/2001 |
| JP | 20 01-194603 | 7/2001 |

* cited by examiner

Primary Examiner—James Phan
(74) Attorney, Agent, or Firm—Greenblum & Bernstein, P.L.C.

(57) ABSTRACT

The multi-beam scanning device includes first and second light emitting elements that emit first and second light beams, respectively, a polygon mirror that deflects the first and second light beams to simultaneously scan the first and second light beams across an object. A prism having a light entrance portion and a light exit portion is located between the light emitting elements and the polygon mirror such that the first light beam enters the first prism through the light entrance portion and exits from the first prism through the light exit portion toward the polygon mirror. The light exit portion is inserted into the optical path of the second light beam to prevent a part of the second light beam from proceeding toward the polygon mirror.

20 Claims, 10 Drawing Sheets

MULTI-BEAM SCANNING DEVICE

BACKGROUND OF THE INVENTION

The invention relates to a multi-beam scanning device that simultaneously scans a plurality of light beam on an object.

Optical image forming devices such as laser printers and digital copy machines form images on a photoconductive drum by scanning a light beam thereon. Recently, such optical image forming devices are provided with a multi-beam scanning device in which a plurality of light beams are emitted toward a single polygon mirror and deflected toward the photoconductive drum so that those plurality of light beams are simultaneously scanned across the photoconductive drum. By simultaneously scanning a plurality of light beams as above, the optical image forming devices are enhancing the image forming rate.

Japanese Patent provisional publication HEI 8-304722 discloses a multi-beam scanning device that simultaneously scans a plurality of light beams with a single polygon mirror. In the disclosed device, two light beams hit the polygon mirror after being arranged parallel and adjacent to each other by utilizing a beam splitter. This multi-beam scanning device, however, raise the cost of the optical image forming device since the beam splitter, which is a relatively expensive optical element, is utilized.

Japanese Patent provisional publication P2000-249948 discloses a multi-beam scanning device in which two light beams are incident on the same location of the polygon mirror at different incident angles. This device can be produced at lower cost than the one disclosed in Japanese Patent provisional publication HEI 8-304722 since it does not utilizes any beam splitters to place the light beam parallel and adjacent to each other.

However, since the light beams are incident on the polygon mirror at different incident angles, the range of the polygon mirror rotating angle that is required to scan the light beam across the photoconductive drum differs between the two light beams. The difference in the ranges of the polygon mirror rotating angle results in different characteristics of the bowing of the scan line and/or the scanning speed of the two light beams and causes deterioration of the quality of the image formed. Further, the angle range difference also requires the use of an large polygon mirror, which raise the cost of the production, since the reflecting surface of the polygon mirror have to be wide enough to achieve the scanning of both of the two light beams. Furthermore, the use of the large polygon mirror requires a high power motor for rotating the polygon mirror in high revolving speed, which also raise the cost of the production.

To avoid the disadvantages mentioned above, it is required to minimize the difference of the incident angles of the light beams impinging on the polygon mirror. However, in the device disclosed in the Japanese Patent provisional publication P2000-249948, the difference between the incident angles cannot be made smaller than a value that is determined by the diameters of collimators located on the optical paths of the two light beam.

SUMMARY OF THE INVENTION

The present invention is advantageous in that a multi-beam scanning device is provided which has a simple optical configuration and can be produced in low cost.

According to an aspect of the invention, there is provided a multi-beam scanning device that includes first and second light emitting elements that emit first and second light beams, respectively, a polygon mirror that deflects the first and second light beams to simultaneously scan the first and second light beams across an object, and a first prism having a light entrance portion and a light exit portion. The first light beam enters the first prism through the light entrance portion and exits from the first prism through the light exit portion toward the polygon mirror. The light exit portion is inserted into the optical path of the second light beam to prevent a part of the second light beam from proceeding toward the polygon mirror.

In the multi-beam scanning device configured as above, the first light beam exiting from the first prism is located close to the second light beam with substantially no gap therebetween. As a result, the first and second light beams impinge on the polygon mirror at incident angles of which difference is quite small and therefore the first and second light beams can be scanned across the object with a small and cheap polygon mirror.

The first prism may be configured such that the light exit portion includes a reflection plane provided with a reflection layer so that it reflects the first light beam toward the polygon mirror while blocking the part of the second light beam. Alternatively, the first prism may be configured such that the light exit portion includes a reflection plane which reflects the first light beam impinging thereon toward the deflector by total internal reflection and refracts the part of the second light beam so that it does not proceed toward the polygon mirror.

In some cases, the light exit portion includes a corner of the first prism which has a chamfered edge. One of the plane that is defining the corner is a reflection plane that reflects the first light beam toward the polygon mirror. The first light beam impinges on the reflection plane such that a part of the first light beam impinges on the chamfered edge. The surface of the chamfered edge may be finished such that the first light beam incident thereon is scattered. Further, the first prism may include a blocking groove that restricts the amount of light of the first light beam incident on the chamfered edge.

In some cases, the multi-beam scanning device includes a third light emitting element that emits a third light beam, and a second prism having a light entrance portion and a light exit portion. The third light beam enters the second prism through the light entrance portion and exits from the third prism through the light exit portion toward the polygon mirror. The light exit portion is inserted into the optical path of the second light beam to prevent a part of the second light beam from proceeding toward the polygon mirror. The first and second prisms are arranged to define a gap between the exit portions thereof. The second light beam passes through the gap. The width of the second light beam proceeding toward the polygon mirror is restricted by the gap.

In the above case, the multi-beam scanning device may further include a slit located on the optical paths of the first and third light beams extending from the first and second prisms to the polygonal mirror. The slit adjusting the width of the first and third light beams to be the same as the width of the second light beam.

In some cases, the multi-beam scanning device has a single supporting member, which may be made from a material having high heat conductivity, and the first, second and third light emitting elements are supported by this single supporting member. The first and second prisms may be also supported by the same supporting member.

According to another aspect of the invention, a light source is provided that includes first and second light emitting elements that emit first and second light beams, respectively, a first prism, and a single supporting member that supports the first and second light emitting elements and the first prism. The first prism is located such that the first light beam enters the first prism. The first prism has a light exit portion through which the first light beam exits from the first prism in a predetermined direction. The light exit portion is inserted into the optical path of the second light beam to prevent a part of the second light beam from proceeding in the predetermined direction.

BRIEF DESCRIPTION OF THE ACCOMPANYING DRAWINGS

FIG. 1 schematically shows a configuration of a multi-beam scanning device according to a first embodiment of the invention;

Figure 5:
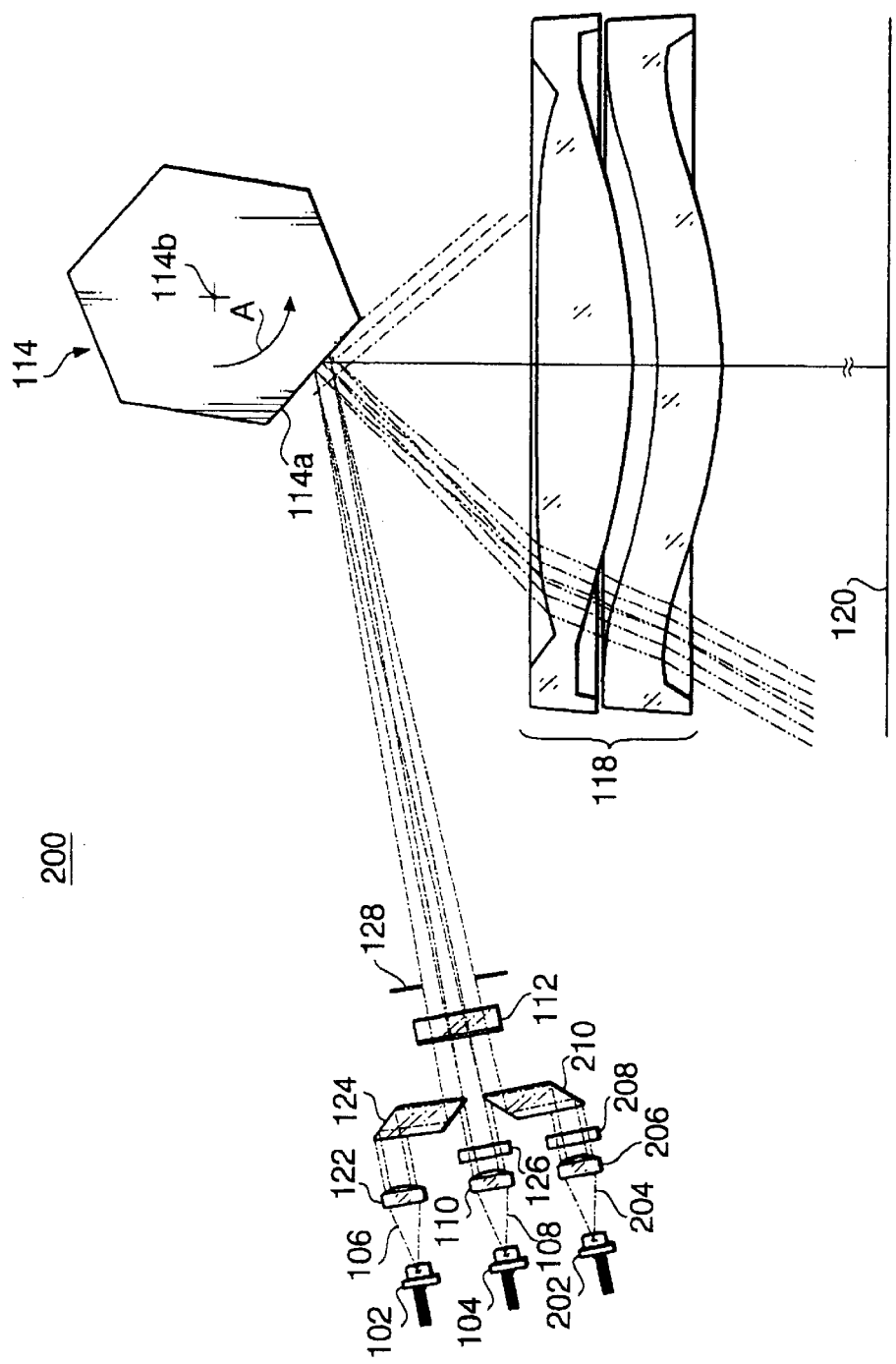
FIG. 5 shows a multi-beam scanning device according to another embodiment of the invention.
Figure 7A:
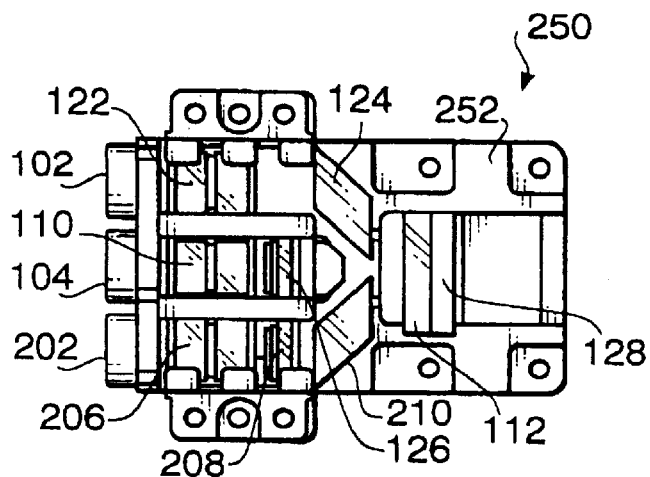
Figure 7B:
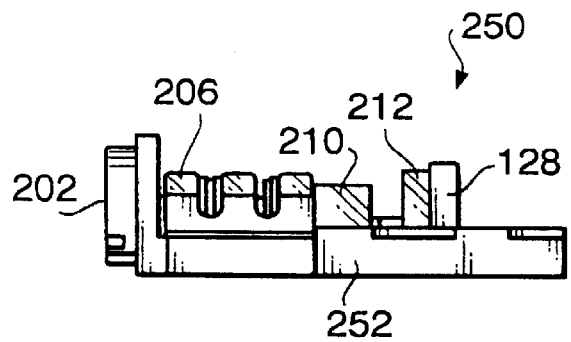
Figure 7C:
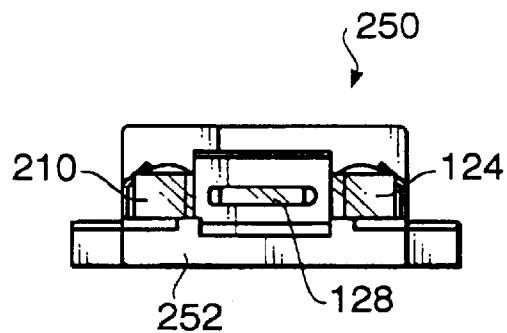
Figure 8:
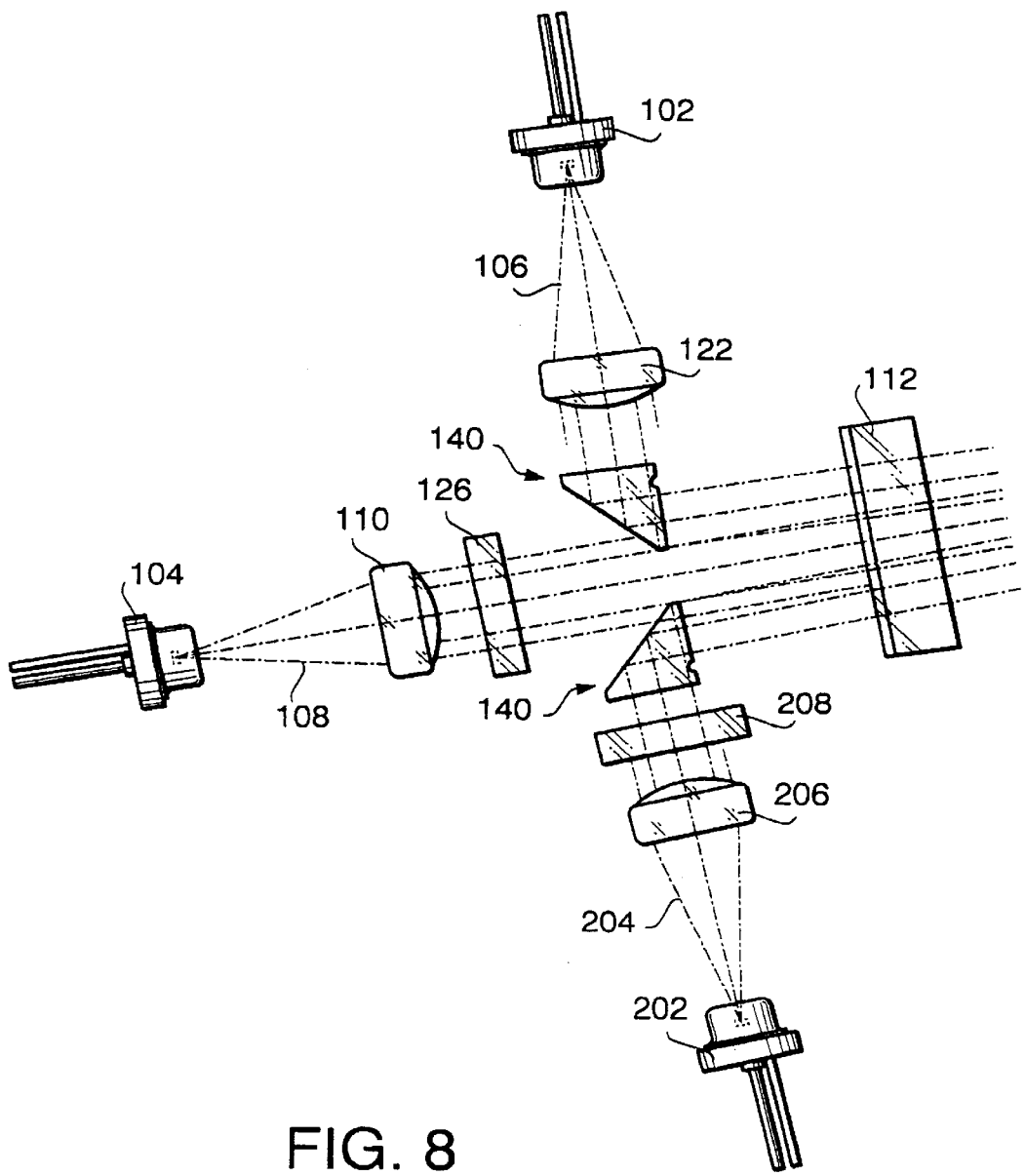
Figure 9:
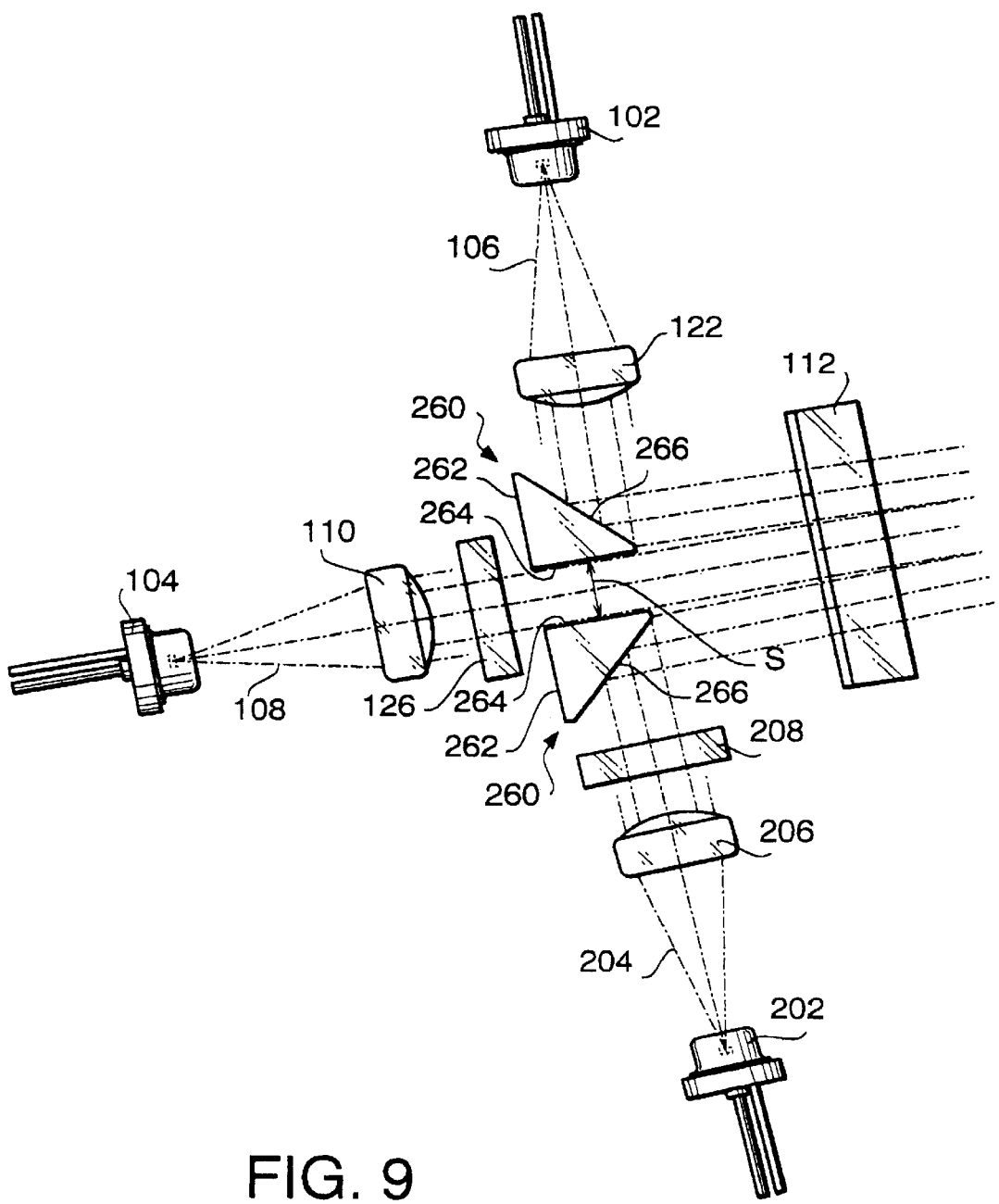
Figures 10, 11:
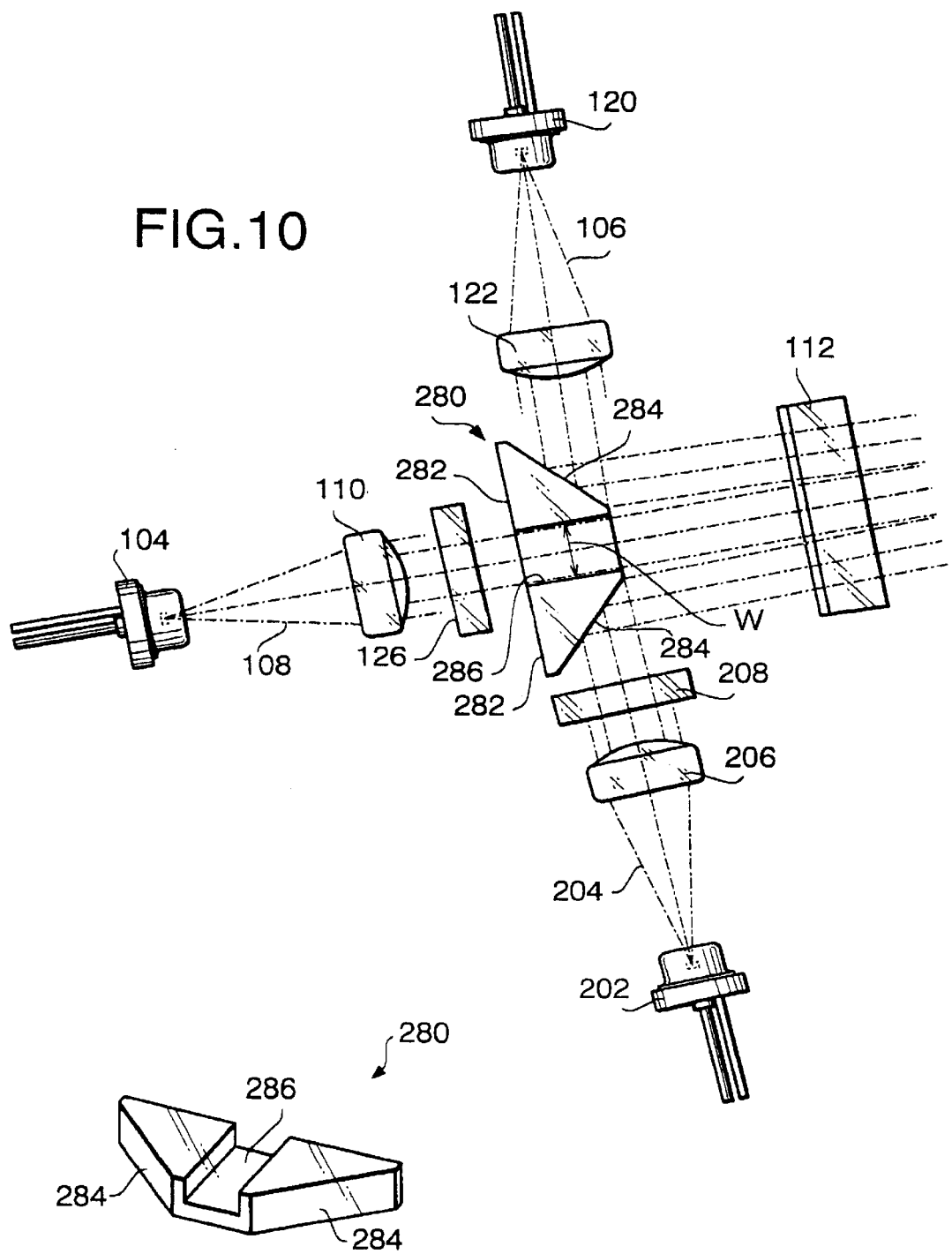

FIGS. 7a through 7c respectively show a plane view, a side view, and a front view of an exemplary light source device that can be utilized in the multi-beam scanning device shown in FIG. 5;

FIG. 8 shows a configuration of a part of a modification of the multi-beam scanning device shown in FIG. 5;

FIG. 9 shows a configuration of a part of another modification of the multi-beam scanning device shown in FIG. 5;

FIG. 10 shows a configuration of a part of still another modification of the multi-beam scanning device shown in FIG. 5; and FIG. 11 is a perspective view of a prism shown in FIG. 10.

DETAILED DESCRIPTION OF THE EMBODIMENTS

Hereinafter, embodiments of the present invention will be described with reference to the accompanying drawings.

Figure 1:
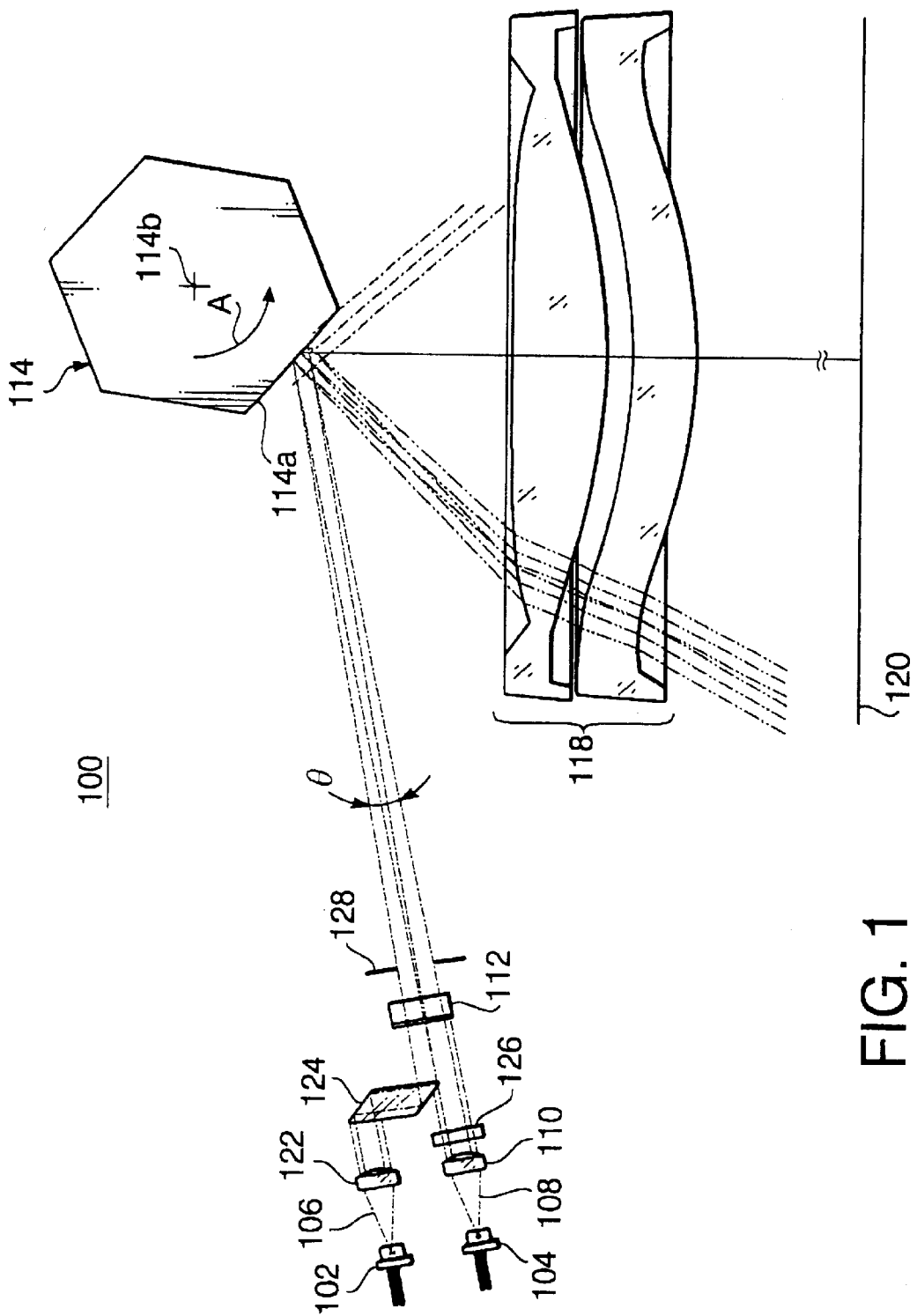

FIG. 1 schematically shows a configuration of a multi-beam scanning device 100 according to a first embodiment of the invention. The multi-beam scanning device 100 is provided with first and second light emitting elements 102 and 104. The first and second light emitting elements 102 and 104 are, for example, laser diodes emitting first and second light beams 106 and 108, respectively. The first and second light emitting elements 102 and 104 emit the light beams substantially in parallel with each other and substantially along a plane perpendicular to a rotation axis of a polygon mirror 114.

The second light beam 108 emitted from the second light emitting element 104 is collimated by a collimator lens 110. Then, the second light beam 108 passes through a cylindrical lens 112 and then hits a reflective surface 114a of the polygon mirror 114. The cylindrical lens 112 has power only in a direction parallel to the rotation axis 114b of the polygon mirror 114 and converges the light beam in the vicinity of the reflective surface 114a of the polygon mirror 114.

The second light beam 108 reflected by the reflective surface 114a passes through an fθ lens 118 and forms a beam spot on an object 120. Accordingly, when the polygon mirror 114 rotates at a constant rotational speed, then the beam spot scans the object 120 at a constant velocity.

It should be noted that a direction along which the beam spot scans the object 120 will be referred to hereinafter as a main scanning direction. Further, a direction perpendicular to the main scanning direction on the object 120 (a direction parallel to the rotation axis 114b of the polygon mirror 114) will be referred to hereinafter as an auxiliary scanning direction.

The first light beam 106 emitted from the first light emitting element 102 enters a prism 124 after being collimated by a collimator lens 122. The prism 124 deflects the first light beam 106 such that the first light beam 106 becomes close to the second light beam 108 and then proceeds toward the polygon mirror 114. The prism 124 emits the first light beam 106 such that the first and second light beams 106 and 108 hit the reflective surface 114a of the polygon mirror 114 at substantially same location. Accordingly, the first and second light beams 106 and 108 between the prism 124 and the polygon mirror 114 are not parallel to each other, but have an angle θ therebetween in the direction of the rotation of the polygon mirror 114.

The first light beam 106 passed through the prism 124 further passes through the cylindrical lens 112 and is reflected by the reflective surface 114a of the polygon mirror 114. The first light beam 106 reflected by the polygon mirror 114 passes through the fθ lens 118 and forms a beam spot on the object 120 which scans the object 120 in the main scanning direction.

A position adjusting element 126 is provided on the optical path of the second light beam 108 between the collimator lens 110 and the cylindrical lens 112. A prism having a wedge sectional shape, for example, may be utilized as the position adjusting element 126. The position adjusting element 126 is utilized for adjusting the location or height at which the second light beam 108 enters the cylindrical lens 112. This location is adjusted to be apart from that of the first light beam 106 for a predetermined small distance in the auxilliary scanning direction. By adjusting the location where the second light beam 108 enters the cylindrical lens 112 as above, the second light beam 108 passed through the cylindrical lens 112 becomes to be inclined against the fist light beam 106 for a small angle in the auxiliary scanning direction. This inclination of the second light beam 108 causes the beam spot formed on the object 120 by the second light beam 108 being spaced apart from the beam spot formed by the first light beam 106 for a predetermined small distances in the auxiliary direction, which causes the first and second light beams 106 and 108 to scan different lines spaced apart in the auxiliary scanning direction on the object 120.

A slit 128 is further provided between the cylindrical lens 112 and the polygon mirror 114. The slit 128 has an elongated hole which allows the first and second light beams 106 and 108 passing therethrough. The sections of the first and second beams 106 and 108 are formed into substantially the same shape and size by passing through the slit 128.

Figure 2:
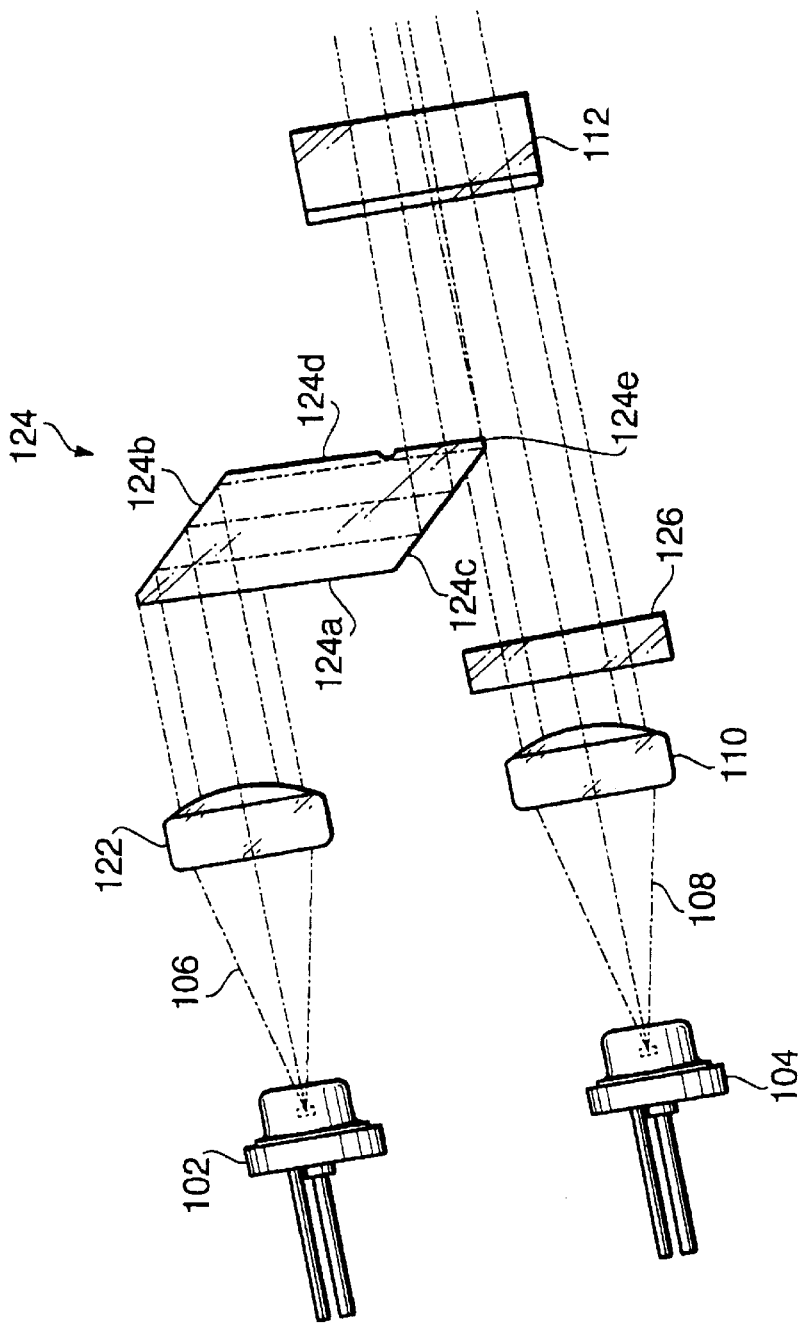
FIG. 2 is an enlarged view of a part of the multi-beam scanning device shown in FIG. 1.

FIG. 2 is an enlarged view of a part of the multi-beam scanning device 100 shown in FIG. 1. As shown in FIG. 2, prism 124 has an entrance plane 124a through which the first light beam 106 enters into the prism 124, first and second reflection planes 124b and 124c each coated by a reflection layer, and an exit plane 124d through which the first light beam 106 proceeds out from the prism 124.

The first light beam 106 enters the prism 124 from a portion of the entrance plane 124a that includes the corner defined between the entrance plane 124a and the first reflection plane 124b. It should be noted that the entrance plane 124a may be provided with an anti-reflection layer to enhance the transmission of the first light beam 106.

The first light beam 106 that has entered the prism 124 is reflected by the first reflection plane 124b towards the second reflection plane 124c, then reflected again by the second reflection plane 124c toward the polygon mirror 114 and emerges from the exit plane 124d.

A chamfered edge 124e is formed at the corner defined between the second reflection plane 124c and the exit plane 124d. The first light beam 106 is reflected by the first reflection plane 124b so that it impinges not only on the second reflection surface 124c but also on the chamfered edge 124e. Thus, the first light beam 106 is also reflected at the edge portion of second reflection plane 124c at the chamfered edge side 124e.

The surface of the chamfered edge 124e is finished such that light incident thereon is scattered. Thus, the light beam reflected at or transmitted trough the chamfered edge 124e does not have large intensity in any particular direction.

The edge portion of the second reflection plane 124c at the exit plane side thereof is inserted into the optical path of the second light beam 108. Accordingly, a part of the second light beam 108 impinges on the edge portion of the second reflection plane 124c. Since the second reflection plane 124c is provided with the reflection layer, the part of the second light beam 108 incident on the second reflection plane 124c is reflected so as not to proceed toward the polygon mirror 114. In other words, a part of the second light beam 108 is blocked by the edge portion of the second reflection plane 124c.

As described above, the edge portion of the second reflection plane 124c blocks a part of the second light beam 108 while reflecting the first light beam 106 toward the polygon mirror 114. Thus, at the exit plane 124d of the prism 124, the first light beam 106 emerges from the prism 124 at an area where the second light beam 108 is blocked. As a result, the first light beam 106 at the exit plane 124d is located adjacent to the second light beam 108 with no gaps therebetween.

As is already described, the first and second light beams 106 and 108 hitting the polygon mirror 114 at the same location form an angle θ therebetween in the direction of rotation of the polygon mirror 114. The angle θ, however, is very small since the first and second light beams 106 and 108 are located adjacent to each other with no gap therebetween at the exit plane 124d of the prism 124.

Figure 3:
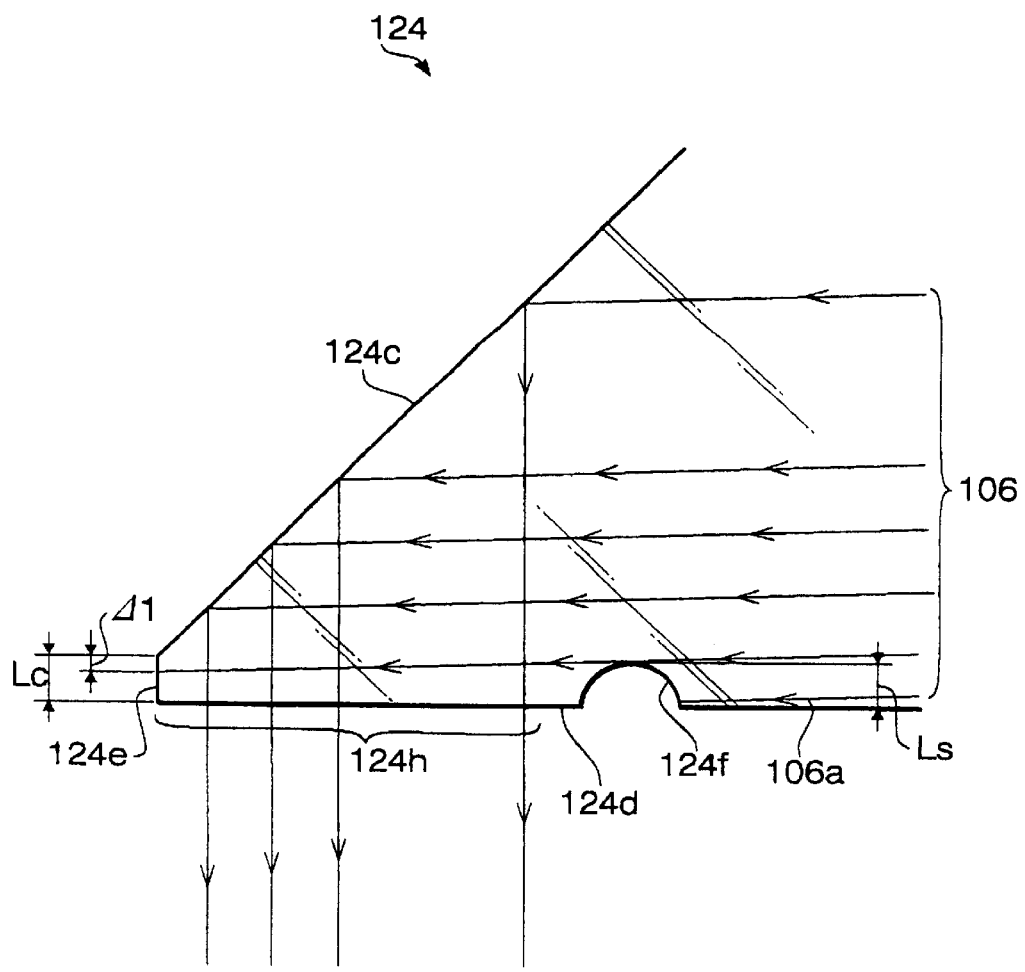
FIG. 3 is an enlarged view of a part of a prism shown in FIG. 1.

FIG. 3 is an enlarged view of a part of the prism 124 shown in FIG. 1, which shows the corner defined between the second reflection plane 124c and the exit plane 124d. A blocking groove 124f is formed to the exit plane 124d of the prism 124. The surface of the blocking groove 124f is finished such that the surface roughness thereof is large enough to scatter light incident thereon. The blocking groove 124f blocks a part of the first light beam 106 traveling from the first reflection plane 124b to the second reflection plane 124c to restrict the amount of light that impinges on the chamfered edge 124e and thereby keep the intensity of the light scattered by the chamfered edge low.

The blocking groove 124f is formed to the exit plane 124d in parallel with the chamfered edge 124e. Further, the blocking groove 124f is formed at a location on the exit plane 124d through which the first light beam 106 does not emerge from the prism 124. A part of the first light beam 106 impinges on and is scattered by the blocking groove 124f, as indicated by a line 106a in FIG. 3. The blocking groove 124f is formed so that Ls<Lc is satisfied, where Ls and Lc represent the depth of the blocking groove 124f and the width of chamfered edge 124e, respectively. If the blocking groove 124f is formed as above, the first light beam 106 hits the chamfered edge 124e only at the upper portion of which width is Δl (Δl is substantially equal to Lc−Ls). By restricting the amount of light incident on the chamfered edge 124e as above, the occurrence of scattered light having high intensity is prevented.

It should be noted that the configuration of the prism 124 of the multi-beam scanning device 100 shown in FIG. 1 can be modified in many ways. For example, an anti-reflecting layer may be coated on the exit plane 124d between the chamfered edge 124e and the blocking groove 124f, or, at least at an area through which the light beam 106 emerges. Further, a light shielding layer may be formed on rest of the exit plane 124d so as to prevent the scattered light from emerging from the prism 124 toward the polygon mirror 114.

Further, the prism 124 may be formed and/or arranged in the multi-beam scanning device 100 such that the first light beam 106 impinges on the first reflection plane 124b with an incident angle greater than the critical angle. If the first prism is formed and/or arranged as above, the first light beam 106 is reflected at the first reflection plane 124b by total internal reflection. Accordingly, it becomes unnecessary to coat the first reflection plane 124b with the anti-reflection layer which allows the prism 124 to be produced in low-coast.

The prism 124 may be further formed and/or arranged in the multi-beam scanning device 100 such that the first light beam 106 is reflected by total internal reflection also at the second reflection plane 124c. In this case, the reflection layer for blocking the part of the second light beam 108 may be coated only on the area where the second light beam 108 hits the second reflection plane 124c. Alternatively, the second reflection plane 124c may be provided without any reflection layer so that the second light beam 108 impinging thereon is refracted by the prism 124 (second reflection plane 124c) and proceeds in a direction where the polygon mirror 114 does not exist after it has passed through the prism 124. The prism 124 configured as above can be produced in low-cost since the second reflection plane 124c does not have any or only a small area coated with the reflection layer.

Figure 4:
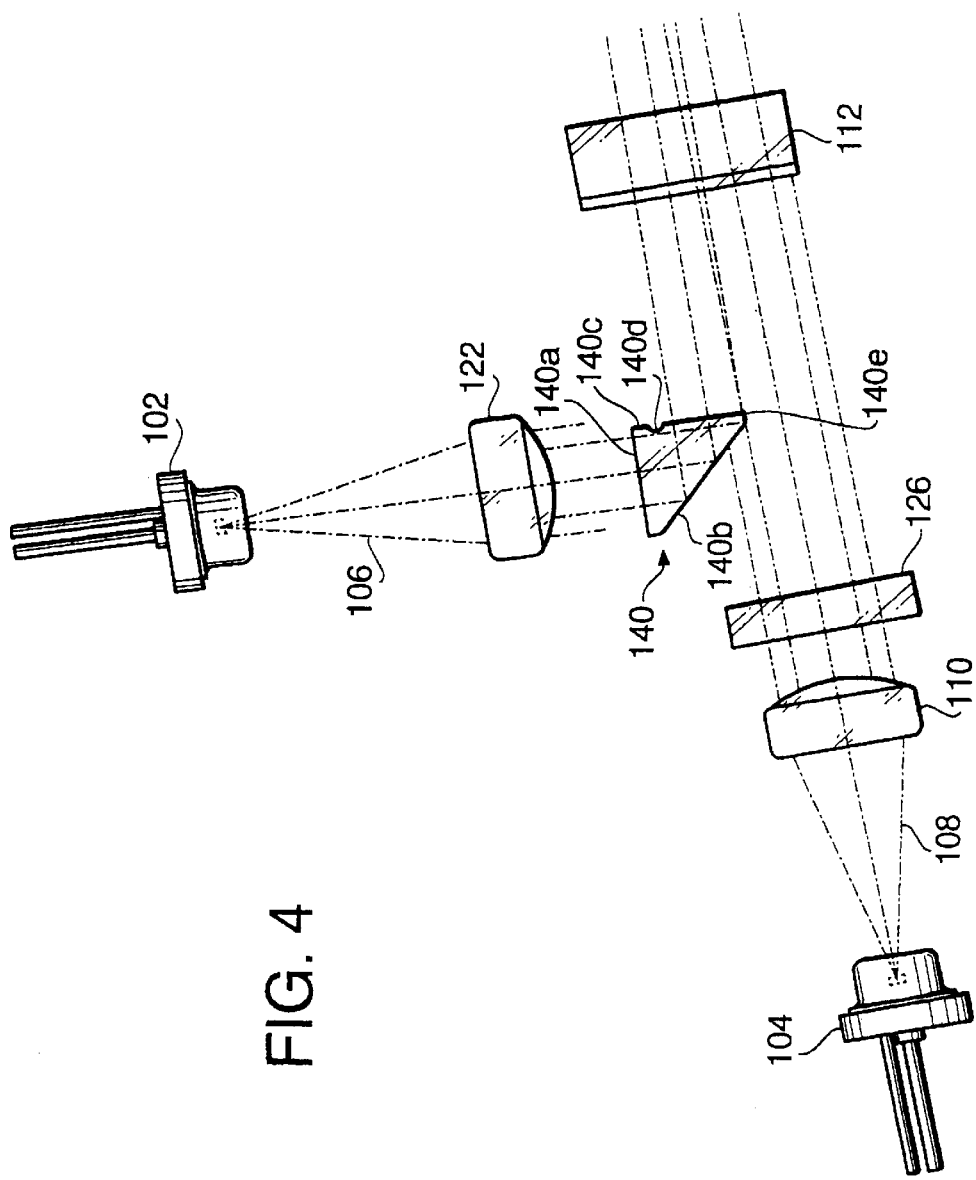
FIG. 4 shows a configuration of a part of a modification of the multi-beam scanning device shown in FIG. 1.

FIG. 4 shows the configuration from the light emitting elements 102 and 104 to the cylindrical lens 112 of a modification of the multi-beam scanning device 100 shown in FIG. 1. In the modification of the multi-beam scanning device 100 shown in FIG. 4, the quadratic prism 124 is replace with a triangular prism 140 which is obtained by cutting off a part including the first reflection plane 124b from the quadratic prism 124.

The prism 140 has an entrance plane 140a through which a light beam enters the prism 140, a reflection plane 140b that reflects the light beam toward the polygonal mirror 114, and an exit plane 140c through which the light beam proceeds out from the prism 140. A chamfered edge 140e is formed at a corner defined between the reflection plane 140b and the exit plane 140c. A blocking groove 140d is formed to the exit plane 140c, which has the same function as that of the blocking groove 124f of the prism 124 shown in FIG. 1. The reflection plane 140b and the chamfered edge 140e have substantially the same configurations and functions as that of the second reflection plane 124c and the chamfered edge 140e of the prism 124 of FIG. 1, respectively.

The prism 140 allows the first light emitting element 102 to be arrange so as to emit the first light beam 106 in a direction toward the second light beam 108 instead of parallel to the second light beam 108.

FIG. 5 shows a multi-beam scanning device 200 according to another embodiment of the invention. The multi-beam scanning device 200 is a modification the multi-beam scanning device 100 shown in FIG. 1 which is further provided with a third light emitting element 202 so that three laser beams simultaneously scan over the object 120.

The third light emitting element 202 is located on the opposite side of the second light emitting element 104 to the first light emitting element 102 and emits a third light beam 204. The third light beam 204 emitted from the third light emitting element 202 passes through a collimator lens 206 to be collimated and then through a position adjusting element 208 that adjust the location or height at which the second light beam 108 enters the cylindrical lens 112. Then, the third light beam 204 enters a prism 210. Within the prism 210, the third light beam 204 is shifted toward the second light beam 108 and emerges from the prism 210 at a location adjacent to the second light beam 108.

After passing through the prism 210, the third light beam 204 passes through the cylindrical lens 112 and the slit 128 like the first and second light beams 106, 108. By passing through the slit 128, the width (or the shape) of the first and third light beams 106 and 204 are adjusted to substantially the same as that of the second light beam 108. After passing through the slit 128, the third light beam 204 is deflected toward the object 120 by the reflective surface 114a of the polygon mirror 114 like the first and second light beams 106 and 108.

It should be noted that the position adjusting elements 126 and 208 are provided on the optical paths of the second and third light beams 108 and 204, respectively, but not on the optical path of the first light beam 106. This is because the first light beam 106 is utilized as a reference beam for adjusting the position of the other two light beams on the object 120 in the auxiliary scanning direction. The first light beam 106 is utilized as the reference beam because it is the first one that appears on the object 120 among the three light beams when the polygon mirror 114 is rotated (in counter-clockwise direction as shown by arrow A in FIG. 5) and it is easy to adjust the positions of the second and third light beams 108 and 204, which appear on the object 120 after the first light beam 106, relative to the first light beam 106.

Figure 6:
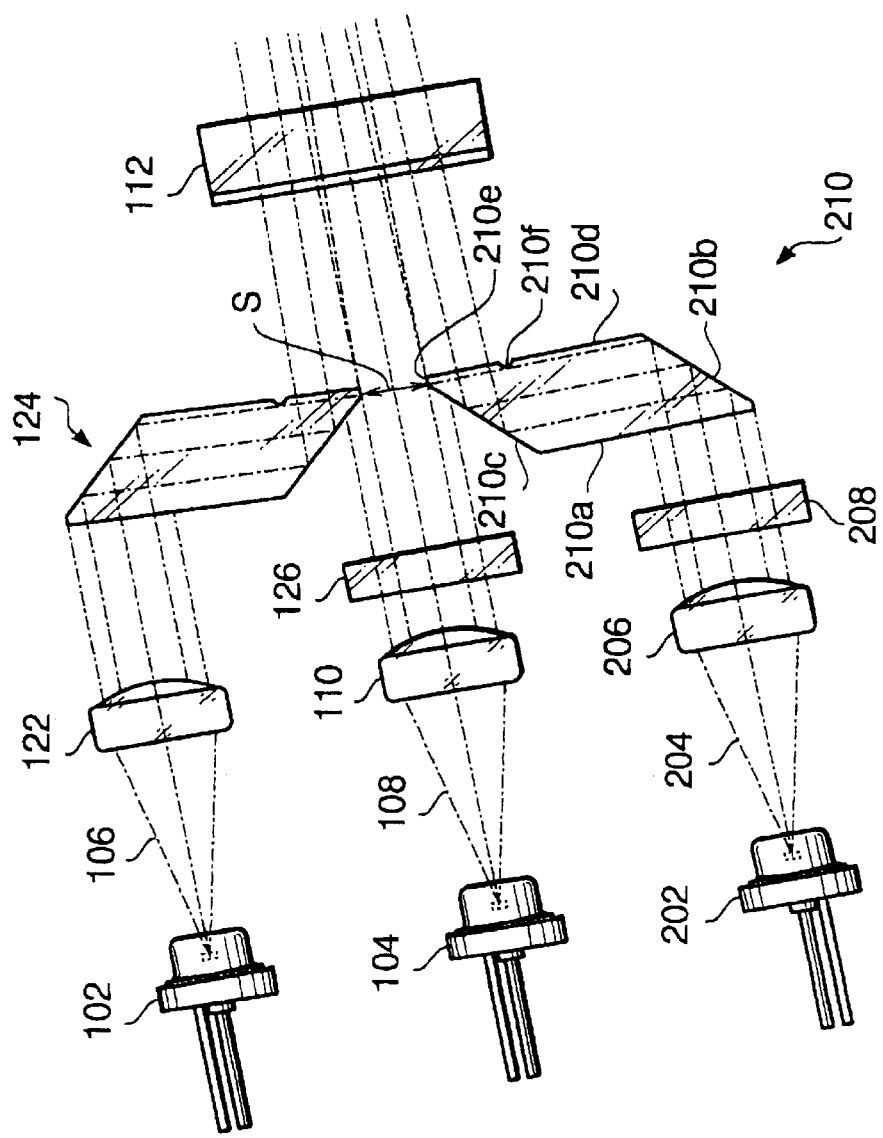
FIG. 6 shows a configuration of a part of the multi-beam scanning device shown in FIG. 5.

FIG. 6 shows the configuration of a part of the multi-beam scanning device 200 shown in FIG. 5. As can be seen in FIG. 6, the prism 210 located on the optical path of the third light beam 204 has substantially the same configuration as that of the prism 124 located on the optical path of the first light beam 106. That is, the prism 210 has an entrance plane 210a through which the third light beam 204 enters the prism 210, first and second reflection planes 210b and 210c that reflect the third light beam 204, and an exit plane 210d through which the third light beam proceeds out from the prism 124.

The third light beam 204 enters the prism 210 from a portion of the entrance plane 210a that includes the corner defined between the entrance plane 210a and the first reflection plane 210b. The third light beam 204 that has entered the prism 210 is reflected by the first reflection plane 210b toward the second reflection plane 210c, then further reflected by the second reflection plane 210c toward the polygon mirror 114 and emerges from the exit plane 124d.

A chamfered edge 210e is formed at the corner defined between the second reflection plane 210c and the exit plane 210d. The third light beam 204 reflected by the first reflection plane 210b impinges not only on the second reflection surface 210c but also on the chamfered edge 210e. Thus, the third light beam 204 is also reflected at the edge portion of second reflection plane 210c at the chamfered edge side.

As in the case of the prism 124, the surface of the chamfered edge 210e is finished such that the light incident thereon is scattered. Further, a blocking groove 210f is formed to the exit plane 210d to reduce the amount of the third light beam 204 incident on the chamfered edge 210e.

The edge portion of the second reflection plane 210c at the exit plane side thereof is inserted into the optical path of the second light beam 108. Accordingly, a part of the second light beam 108 impinges on the edge portion of the second reflection plane 210c. As in the case of prism 124, a reflection layer is formed on the second reflection plane 210c. Thus, the part of the second light beam 108 incident on the second reflection plane 210c is reflected and does not proceeds toward the polygon mirror 114.

As described above, the edge portion of the second reflection plane 210c blocks a part of the second light beam 108 while reflecting the third light beam 204 toward the polygon mirror 114. Thus, at the exit plane 210d of the prism 210, the third light beam 204 emerges from the prism 210 at an area where the second light beam 108 is blocked. As a result, the third light beam 204 at the exit plane 210d is located adjacent to the second light beam 108 with no gaps therebetween.

As shown in FIG. 6, the prism 124 and the prism 210 are arranged such that a gap S is formed between them that allows the second light beam passing therethrough toward the polygon mirror 114. It should be noted that the prism 124 and the prism 210 are preferably arranged such that the primary ray of the second light beam 108 passes through the gap S at about the center thereof. The gap S between the prism 124 and the prism 210 defines the width of the second light beam 108.

FIGS. 7a through 7c respectively show a plane view, a side view, and a front view of an exemplary light source device 250 that can be provided to the multi-beam scanning device 200 shown in FIG. 5. The light source device 250 has a supporting member or a base 252 on which the first through third light emitting elements 102, 104 and 204, the collimator lenses 122, 110, and 206, the position adjusting elements 126 and 208, the prisms 124 and 210, the cylindrical lens 112 and the slit 128 are mounted.

The first, second and third light emitting elements 102, 104 and 202 are mounted on the supporting member 252 such that they emit the first, second and third light beams 106, 108 and 204 substantially parallel to each other within a same plane. The driving circuits of the light emitting elements 102, 104 and 202 (not shown) are mounted to the light source device 250 at the back side of the light emitting elements 102, 104 and 202 (the opposite side of the beam emitting elements to the side from which the beams are emitted).

In the multi-beam scanning device 200 shown in FIG. 5, it is necessary to keep the first, second and third light beams 106, 108 and 204 passed through the collimator lenses 122, 110 and 206 substantially parallel to each other irrespective the temperature variation in/around the multi-beam scanning device 200. If the parts constituting the multi-beam scanning device 200 (in particular, the parts constituting the light source device 250) expand or contract due to temperature variation, the light emitting elements 102, 104 and 204 and the collimator lenses 122, 110 and 206 displaces from their original position and cause the light beams 106, 108 and 204 passed through the collimator lenses 122, 110 and 206 to incline to each other. Even a small inclination of the light beams in the vicinity of the collimator lenses 122, 110 and 206 results in a large displacement of the beam spots formed on the object 120 and, in turn, a significant deterioration of the quality of the image formed on the object 120.

In the light source device 250 shown in FIG. 7, the light beams passed through the collimator lenses 122, 110 and 206 remains parallel to each other even if the light source device expand/contract due to temperature variation since the light emitting elements 102, 104 and 202 and the corresponding collimator lenses 122, 110 and 206 are mounted on the same supporting member 252 which is formed as a single member. Accordingly, the quality of the image formed on the object 120 does not deteriorate due to temperature variation.

In some cases, the supporting member 252 is made from a material having high heat conductivity such as metal to prevent the effect of temperature variation on the light emitting elements 102, 104 and 202. In some sorts of light emitting element, such as laser diodes, a so-called mode hop occurs when their temperature change. That is, the wave length of the light emitted by the light emitting element varies with the temperature of the element. If such elements are used as the first, second and third light emitting elements 102, 104 and 202, it can be happen that the three light emitting elements 102, 104 and 202 operate at different temperatures and emit lights having different wave length to each other. When the first, second and third light beams 106, 108 and 204 have different wave lengths, the locations of the beam spots formed on the object 120 by those light beams 106, 108 and 204 displace from their expected locations due to chromatic aberrations. As a result, jitter will appear in the image formed.

If the supporting member 252 of the light source device 250 is made from a material having high heat conductivity, the supporting member 252 keeps the operating temperature of the first through third light emitting elements 102, 104 and 202 at substantially the same temperature and prevent the first through third light beams 106, 108 and 204 from having different wave lengths to each other. As a result, jitter will not appear in the image formed by these light beams on the object 120.

It should be noted that the configuration of the multi-beam scanning device 200 can be modified in various ways. For example, as shown in FIG. 8, the quadratic prism 124 and 210 may be replaced with two triangular prisms 140 shown in FIG. 4.

FIG. 9 shows a configuration of a part of another modification of the multi-beam scanning device 200 shown in FIG. 5. Also in this modification, the two quadratic prisms 124 and 210 are replaced with two triangular prisms 260.

The prism 260 has a first plane 262, a second plane 264 and a third plane 266. The third plane 266 is provided with a reflection layer. The two prisms 260 are arranged such that the second planes 264 are parallel to the principal ray of the second light beam 108 and spaced apart from each other to form a gap S. Although it is not an essential feature of the optical configuration shown in FIG. 9, the two prisms 260 are arranged such that the principal ray of the second light beam 108 passes through the gap S at about the center thereof.

In the configuration described above, a part of the second light beam 108 impinges on the first plane 262 of one of the two prisms 260, while another part impinges on the first plane 262 of the other prism 260. The light beams that have entered the respective prisms 260 are then reflected by the respective reflection layers formed on the third planes 266 so that they do not proceed toward the polygon mirror 114. As a result, the width of the second light beam 108 traveling toward the polygon mirror 14 is restricted to the same width of the gap S formed between the two prisms 260.

The first and third light emitting elements 102 and 202 and the respective collimator lenses 122 and 206 are arranged such that the first and third light beams 106, 204 proceed toward the second light beam 108 along the plane along which the second light beam travels. The first and third light beams hits the third plane 266 of respective prisms 260 and are deflected toward the polygon mirror 114 by the reflection layers.

It should be noted that a reflection layer may be provided on the first plane 262 of each prism 260 to reflect a part of the second light beam 108 to prevent it from proceeding toward the polygon mirror 114. Alternatively, the surface of the first plane 262 of each prism 260 may be finished so that the transmittance of the light beam is substantially zero or low enough to prevent harmful effect of the light passed therethrough on the scanning area of the object 120. For example, the first plane 262 may be made opaque by grinding, pigmentation, or attaching an opaque material.

Further, the prism 260 may be replaced with a metal member, e.g., aluminum member, shaped in substantially the same form as that of the prism 260 having a mirror finished plane at the location corresponding to the third plane 266. Alternatively, the prism 260 may be replaced with an opaque member shaped in substantially the same form as that of the prism 260 and having a light reflecting plane at the location corresponding to the third plane 266.

FIG. 10 shows a configuration of a part of still another modification of the multi-beam scanning device 200 shown in FIG. 5. In this modification, two quadratic prisms 124 and 210 are replaced with a single prism 280.

FIG. 11 is a perspective view of the prism 280 shown in FIG. 10. As shown in FIGS. 10 and 11, the prism 280 has two front planes 282 two rear planes 284 and a groove 286 formed between the front planes 282 and also between the rear planes 284.

The prism 280 is located such that the first and third light beams 106 and 204 are incident on respective rear planes 284 at an area including the edge thereof at the polygon mirror side.

Each of the rear planes 284 is provided with a reflection layer for reflecting the incident light beam toward the polygon mirror 114.

The prism 280 is located on the optical path of the second light beam 108 such that the second light beam 108 passes through the groove 286 in parallel therewith, and such that the second light beam partially impinges on both of the front planes 282. The light incident on the front plane 282 enters the prism 280 and proceeds toward the rear planes 282. Then, the light is reflected by the reflection layers on the rear planes 282 in a direction not toward the polygon mirror 114. In this way, the width of the second light beam 108 is restricted by the prism 280 and becomes equal to the width w of the groove 286.

The prism 280 configured as above is advantageous in that the adjustment of the positions of the rear planes 284 and the adjustment of the positions of the rear planes 282 are not necessary since those planes are formed on the same single prism.

It should be noted that, in the prism 280 shown in FIGS. 10 and 11, reflection layers may be further provided on the front planes 282 of the prism 280 to prevent the second light beam 108 from passing therethrough, or, the surface of the front planes 282 may be finished such that transmission of the second light beam 108 is significantly reduced.

It should be also noted that the prism 280 may be replaced with an opaque member (e.g., metal member such as aluminum member) formed in the same shape as the prism 280 and having reflection surfaces (e.g., mirror finished surfaces) at the planes corresponding to the rear planes 284.

The foregoing description of specific embodiments is offered as an illustration rather than a limitation on the scope of the invention. Various modifications, refinements, additions or subtractions can be made to the disclosed embodiments without departing from the principle and spirit of the invention. For example, in the multi-beam scanning device 100 shown in FIG. 1, two mirrors may be provided instead of the prism 124 at the locations of the first and second reflection planes 124b and 124c to deflect the first light beam 106 while partially blocking the second light beam 108. The prisms 124 and 210 in the multi-beam scanning device 200 shown in FIG. 5 may also be replaced with four mirrors in a similar way.

The present disclosure relates to the subject matters contained in Japanese Patent Applications No. P2002-016756, filed on Jan. 25, 2002, and No. P2002-085875, filed on Mar. 26, 2002, which are expressly incorporated herein by reference in their entireties.

What is claimed is:

1. A multi-beam scanning device comprising:
   first and second light emitting elements that emit first and second light beams, respectively;
   a polygon mirror that deflects the first and second light beams to simultaneously scan the first and second light beams across an object; and
   a first prism having a light entrance portion and a light exit portion, the first light beam entering said first prism through said light entrance portion and exiting from said first prism through said light exit portion toward said polygon mirror, said light exit portion being inserted into the optical path of the second light beam to prevent a part of the second light beam from proceeding toward said polygon mirror.

2. The multi-beam scanning device according to claim 1, wherein said light exit portion includes a reflection plane, said reflection plane reflect the first light beam toward said polygon mirror by total internal reflection while refracting said part of the second light beam so that said part of the second light beam does not proceed toward said polygon mirror.

3. The multi-beam scanning device according to claim 1, wherein said light exit portion includes a reflection plane provided with a reflection layer, said reflection plane reflecting the first light beam toward said polygon mirror while blocking said part of the second light beam.

4. The multi-beam scanning device according to claim 1, wherein said light exit portion includes a corner of said first prism, said corner having a chamfered edge, one of the plane defining said corner being a reflection plane that reflects said first light beam toward said polygon mirror, and
   wherein the first light beam impinges on said reflection plane such that a part of the first light beam impinges on said chamfered edge.

5. The multi-beam scanning device according to claim 4, wherein the surface of said chamfered edge is finished such that the first light beam incident thereon is scattered.

6. The multi-beam scanning device according to claim 4, wherein said first prism includes a blocking groove that restricts the amount of light of the first light beam incident on said chamfered edge.

7. The multi-beam scanning device according to claim 1, further comprising:
   a third light emitting element that emits a third light beam; and
   a second prism having a light entrance portion and a light exit portion, the third light beam entering said second prism through said light entrance portion and exiting from said third prism through said light exit portion toward said polygon mirror, said light exit portion being inserted into the optical path of the second light beam to prevent a part of the second light beam from proceeding toward said polygon mirror;
   wherein said first and second prisms are arranged to define a gap between said exit portions thereof, the second light beam passing through said gap, the width of the second light beam proceeding toward said polygon mirror being restricted by said gap.

8. The multi-beam scanning device according to claim 7, further comprising a slit located on the optical paths of the first and third light beams extending from said first and second prisms to said polygon mirror, said slit adjusting the width of the first and third light beams to be the same as the width of the second light beam.

9. The multi-beam scanning device according to claim 7, comprising a single supporting member that supports said first, second and third light emitting elements.

10. The multi-beam scanning device according to claim 9, wherein said single supporting member supports said first and second prisms.

11. The multi-beam scanning device according to claim 9, wherein said single supporting member is made from a material having high heat conductivity.

12. A light source comprising:
    first and second light emitting elements that emit first and second light beams, respectively;
    a first prism located such that the first light beam enters said first prism, said first prism having a light exit portion through which the first light beam exits from said first prism in a predetermined direction, said light exit portion being inserted into the optical path of the second light beam to prevent a part of the second light beam from proceeding in the predetermined direction; and
    a single supporting member that supports said first and second light emitting elements and said first prism.

13. The light source according to claim 12, wherein said light exit portion includes a reflection plane, said first light beam impinging on said reflection plane at an incident angle larger than a critical angle and being reflected by total internal reflection in the predetermined direction.

14. The light source according to claim 12, wherein said light exit portion includes a reflection plane, a reflection layer being formed on said reflection plane, said reflection plane reflecting the first light beam in the predetermined direction while blocking the part of the second light beam.

15. The light source according to claim 12,
    wherein said light exit portion includes a corner of said first prism, said corner having a chamfered edge, one of the plane defining said corner being a reflection plane that reflects said first light beam in the predetermined direction, and
    wherein the first light beam impinges on said reflection plane such that a part of the first light beam impinges on said chamfered edge.

16. The light source according to claim 15, wherein the surface of said chamfered edge is finished such that the first light beam incident thereon is scattered.

17. The light source according to claim 15, wherein said first prism includes a blocking groove that restricts the amount of light of the first light beam incident on said chamfered edge.

18. The light source according to claim 12, further comprising:

a third light emitting element that emits third light beam; and a second prism having a light entrance portion and a light exit portion, said third light beam entering said second prism through said light entrance portion and exiting from said third prism through said light exit portion in the predetermined direction, said light exit portion being inserted into the optical path of the second light beam to prevent a part of the second light beam from proceeding in the predetermined direction;

wherein said second prism is mounted on said supporting member to define a gap between said exit portions of said first and second prisms, said second light beam passing through said gap, the width of said second light beam proceeding in the predetermined direction being restricted by said gap.

19. The light source according to claim 18, further comprising a slit mounted on said supporting portion such that the first and third light beams pass therethrough, said slit adjusting the width of the first and third light beams to be the same as the width of the second light beam.

20. The light source according to claim 12, wherein said single supporting member is made from a material having high heat conductivity.

* * * * *